United States Patent [19]
Shafer, Jr.

[11] Patent Number: 5,508,571
[45] Date of Patent: Apr. 16, 1996

[54] NEUTRAL CONNECTION FOR WIRE WOUND STATOR

[75] Inventor: George G. Shafer, Jr., Anderson, Ind.

[73] Assignee: General Motors Corporation, Detroit, Mich.

[21] Appl. No.: 353,600

[22] Filed: Dec. 12, 1994

[51] Int. Cl.$^6$ ..................................................... H02K 11/00
[52] U.S. Cl. ................................ 310/71; 310/45; 310/91; 310/179; 310/254; 310/260
[58] Field of Search ............................. 310/71, 179, 180, 310/260, 45, 31, 254, 258, 184

[56] References Cited

U.S. PATENT DOCUMENTS

3,984,712  10/1976  Hill ............................................. 310/71
4,806,814   2/1989  Nold ........................................... 310/71
5,239,743   8/1993  Santandrea ................................. 310/71

Primary Examiner—Robert Skudy
Attorney, Agent, or Firm—Vincent A. Cichosz

[57] ABSTRACT

A stator assembly for a polyphase multi-pole dynamo-electric machine of the variety having at least one common neutral wire connections has a plurality of neutral leads terminated and coupled together by a conductor at one end of the stator. An annular insulator adjacent one end of the stator assembly has a plurality of passages through which the neutral leads are routed. An annular conductor has a plurality of heat concentrating termination sites whereat the neutral leads are mechanically and electrically coupled. The neutral leads are assembled to the insulator and conductor from the outer periphery thereof.

8 Claims, 7 Drawing Sheets

NEUTRAL CONNECTION FOR WIRE WOUND STATOR

BACKGROUND OF THE INVENTION

This invention relates to dynamoelectric machine wire wound stators and particularly to polyphase multi-pole wire wound stators having common neutral wire connections.

In polyphase machines, for example AC induction motors, commonplace stator winding arrangements include groupings of two-terminal coils wherein, for each grouping, one terminal of each coil is a respective voltage phase input terminal (phase terminal) and the other terminals of all coils are commonly coupled and referred to as the neutral connection. For example, in a three phase AC induction motor one grouping consists of three two-terminal coils, one for each phase A, B and C. The three coils are commonly coupled at one respective terminal thereof to form the neutral connection leaving the respective other phase terminals independent one from the other to receive one of the three mutually exclusive phase voltages. This arrangement of coils is commonly referred to as a Y-connection for obvious reasons. Each Y-connection therefore is a grouping of coils as described.

Commonly, an AC induction motor has a plurality of such coil groupings with respective like phase terminals thereof coupled together to operate off of the same input voltage phase and the plurality of individual neutral connections further being commonly coupled one to the other.

Such multiple grouping stator windings are fairly cumbersome in their manufacture. For example, in a common three phase, four pole AC induction motor, twelve individual coils are required. This means that twelve coil terminals, one terminal from each coil, are commonly coupled as a neutral connection. A variety of methods are practiced to accomplish this task, among them being wire splicing, electrical clips, soldering, brazing and combinations thereof. Such joining methods require insulation of such coupling joints to prevent shorting to other portions of the stator windings and/or, since the neutral is floating, to the stator and/or motor housing structures. This method of assembly is labor intensive, not readily adapted to automated manufacturing and subject to excessive variability and questionable durability.

SUMMARY OF THE INVENTION

Accordingly, neutral wire termination is accomplished by providing an insulator that abuts the one set of end turns of the stator assembly whereat the stator winding neutral leads extend. The insulator is shaped to follow generally the shape of at least a portion of the end of the stator, typically annular. The insulator has a number of passages therethrough for routing of the neutral leads. Immediately adjacent the insulator, and opposite the stator, is placed a neutral lead conductor which, too, is shaped to follow generally the shape of at least a portion of the end of the stator. The conductor has a plurality of sites for termination of the neutral leads, which sites correspond positionally with the passages through the insulator. By these means, convenient electrical and mechanical coupling of the neutral leads is provided at the neutral lead conductor via well known metal joining processes.

In one application wherein the stator winding pattern has a single neutral node, the insulator and conductor may conveniently take the general shape of the entire end of the stator, typically annular. In applications wherein the stator winding pattern has multiple neutral nodes, the conductors may take the general shape of a portion of the end of the stator (e.g. arcuate portion of an annulus).

In any application, the passages through the insulator may be slots which are open at an outer periphery thereof allowing for assembly of the neutral leads through the insulator from radially extended positions to axially extended positions. Furthermore, such slots may be substantially L-shaped to allow for movement of the neutral leads into the slots from the outer periphery and trapping the neutral leads by rotation of the insulator during assembly.

Termination sites at the conductor(s) may take the form of any appropriate electro-mechanical coupling. Preferably, the coupling extends or protrudes somewhat from the main body of the conductor such that applied heat during soldering, brazing or welding operations remains substantially concentrated thereby improving the quality of the bond. Additionally, a preferred site provides access to the neutral leads from the outer perimeter such that the leads may be assembled therethrough from radially extended positions to axially extended positions. In a preferred embodiment, the site takes the form of a slot open at the outer periphery of the conductor and a generally U-shaped tower portion bracketing the radially inner portions of the slot and extending substantially normal to the surface of the conductor. Alternatively, the site takes the form of a pair of fingers extending substantially radially from the outer periphery of the conductor.

DETAILED DESCRIPTION OF THE INVENTION

Figure 1:
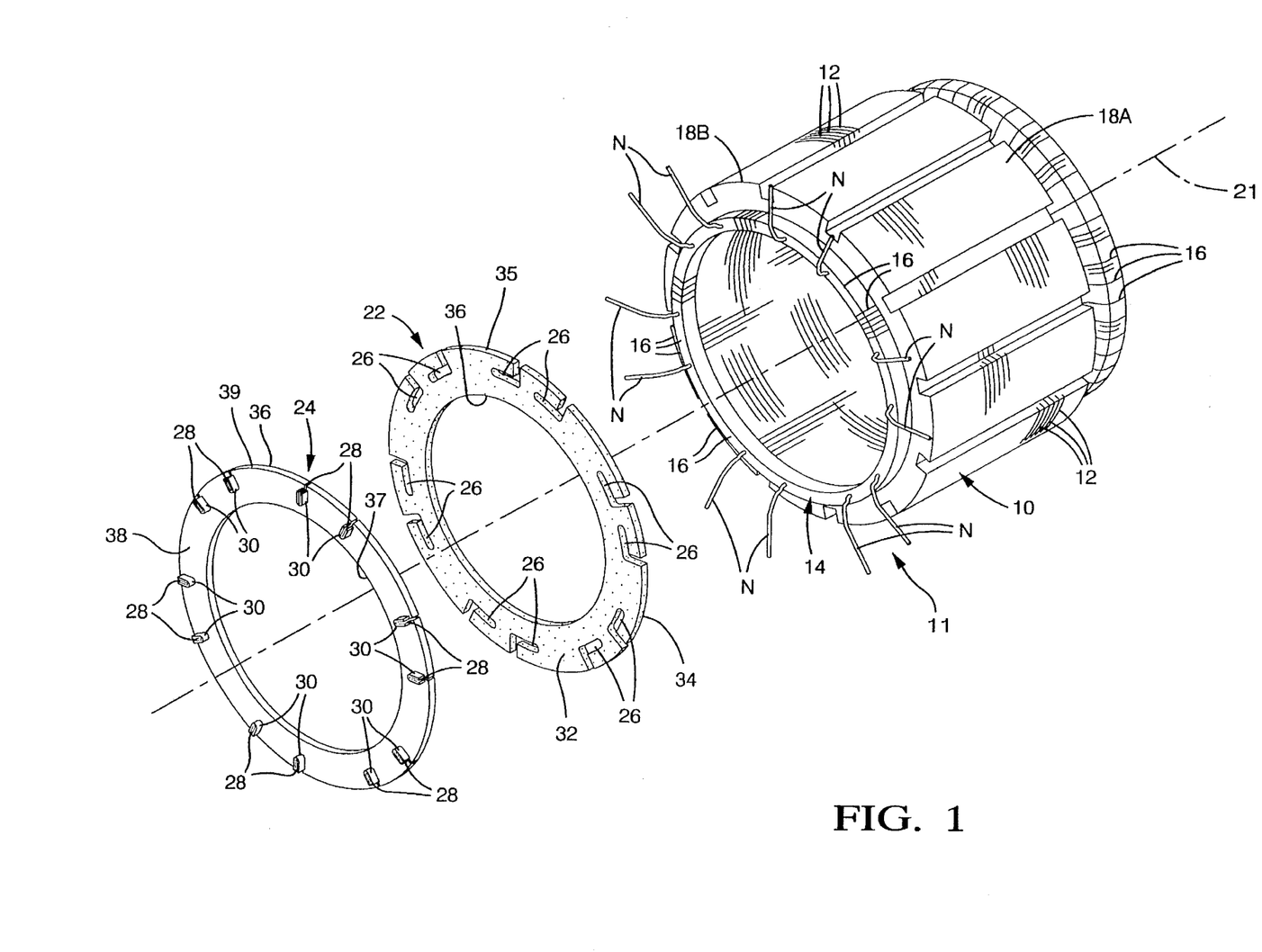
FIG. 1 is a disassembled perspective view of a stator structure and neutral wire termination apparatus for a single neutral node stator winding in accordance with the invention.

In the description to follow referring to the various figures, similar or corresponding parts throughout the several views are designated with like characters. In FIG. 1, a perspective view of a stator assembly 11 and various features thereof germane to the present invention are illustrated. About a longitudinal axis, stator core 10 has a plurality of substantially identical stacked laminations 12 of ferromagnetic material such as steel. Stator core 10 supports stator winding 14 and also provides a high permeability, low loss structure for concentrating the flux generated thereby. Stator winding 14 is typically comprised of a plurality of individual coils wound from multiple individual conductors, typically insulated copper, manually or by machine in a predetermined pattern and inserted into slots at the interior of the stator core with the end turns 16 of each coil protruding beyond opposite axial ends 18A, 18B of the stator core 10.

Figure 8:
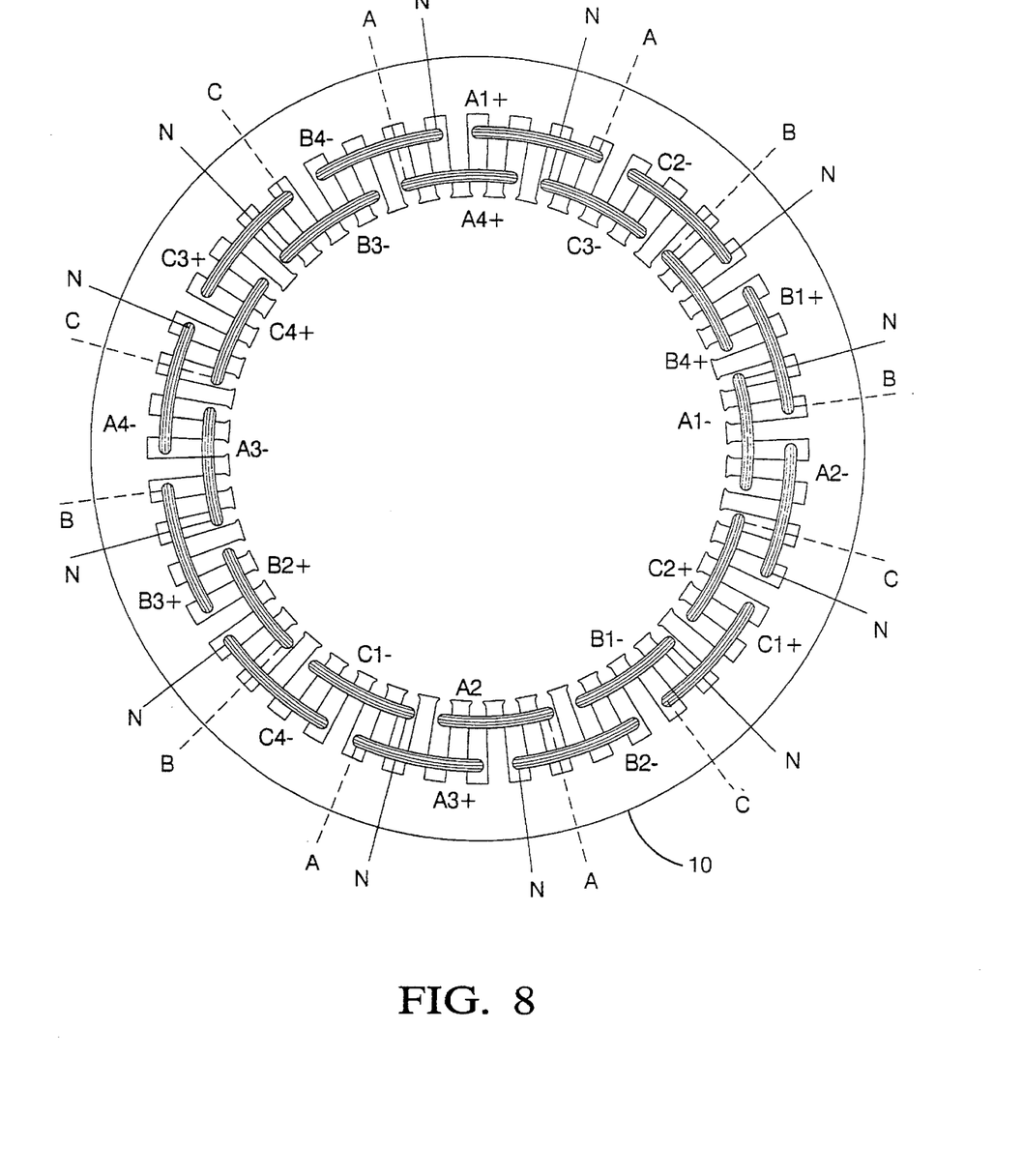
FIG. 8 is a schematic end view of a stator structure and conventional three phase, four pole single neutral node stator winding with neutral leads in a pre-terminated position.
Figure 9:
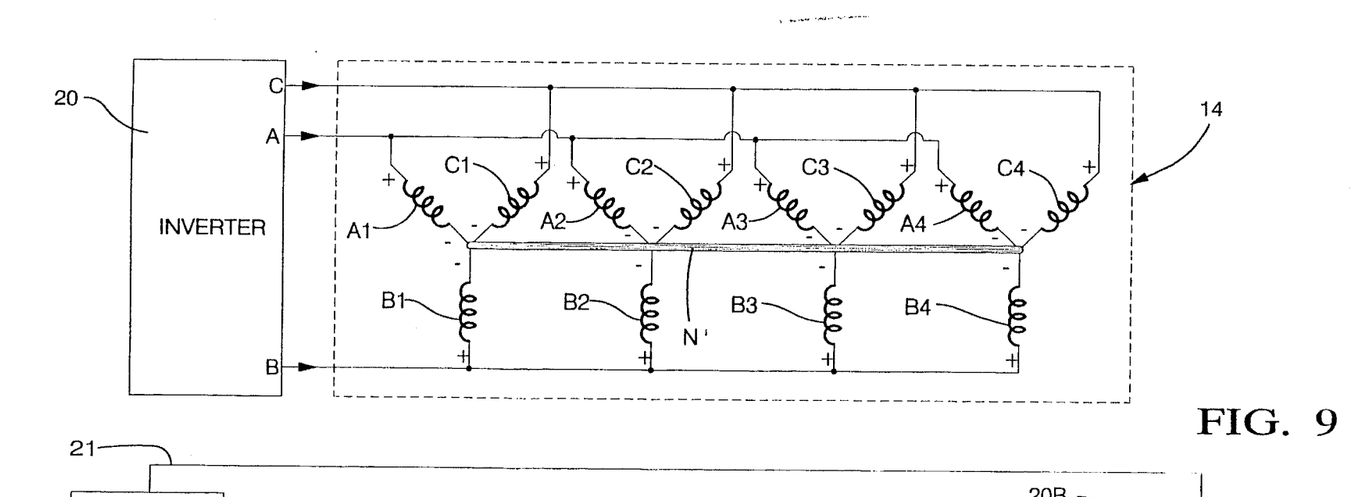
FIG. 9 is a schematic illustration of a three phase, four pole, single neutral node stator winding.

All coils are wound and inserted such that the terminal ends thereof protrude from the same end of stator core 10. The stator winding pattern may be of any type and have any variety of characteristics providing, however, that such characteristics are compatible with a common neutral connection. Some characteristics include, for example, concentric, lap or wave windings, single or double layer, integral or fractional slot, single or multiple wires per coil, distributed etc. The winding pattern used in an exemplary embodiment, and illustrated in FIG. 8 is a fully lapped, distributed, fractional (⅝) pitch winding on a 48 slot stator for a 4 pole, three phase machine. FIG. 8 is a schematic view from the one end 18B from which all coil leads protrude. The sides of each coil are individually labeled with alpha-numeric characters and algebraic signs to define the phase (A, B or C), the coil grouping (1–4) and relative current directions (+/−). Solid lines extending radially outward from certain coil sides represent neutral leads (N). Broken lines extending from other of the coil sides represent respective phase leads as labeled. The winding pattern corresponds to FIG. 9 illustrating the completed stator winding 14 schematically. When completely assembled, like phase lead are coupled together and receive respective phase voltages from an appropriate multi-phase power source such as inverter 20. Likewise, all neutral leads N are coupled together as shown by neutral node N' in FIG. 9. Such a stator and winding structure are generally well known.

After the winding operations have been performed, the appropriate phase and neutral couplings are made. Referring again to FIG. 1, insulator 22 in the general form of a ring or annulus is placed against the end turns 16 of stator winding 14. Insulator 22 has a plurality passages from one side thereof to the other. In a preferred embodiment these passages are open at the outer periphery of the insulator to form slots 26 preferably equal in number at least to the plurality of neutral leads N of stator winding 14. Preferably, the passages are circumferentially spaced to correspond with the spacing of the neutral leads N in accordance with the winding pattern utilized. Alternatively, the neutral leads N may be routed to correspond to the passage positions. The phase leads illustrated in FIG. 8 are not repeated in FIG. 1 for the sake of clarity, but it is to be understood that they too would be bent back in similar fashion to allow the seating of insulator 22 against the end turns of stator winding 14. Passages through the insulator will hereinafter be referred to only as slots.

Neutral lead conductor 24 is next placed against insulator 22, or the two are simultaneously brought to the end turns in the same relative arrangement. Neutral lead conductor 24 has a plurality of neutral lead termination sites corresponding in number and orientation to the slots in insulator 22. These sites preferably are accessible to respective neutral leads from the outer perimeter of the neutral lead conductor 24.

It can now be appreciated that neutral leads may now be brought into respective neutral lead termination sites by bending the lead from the illustrated radially extending position to an axially extending position. Each neutral lead, therefore, passes axially through a corresponding slot of the insulator 22 and neutral lead termination site of the neutral lead conductor 24. The portion of each neutral lead at the respective neutral lead termination site of neutral lead conductor 24 is preferably free from electrical insulation to improve bonding to the neutral lead conductor 24 during a solder or braze operation. Therefore, a stripping operation may be performed prior to placing the neutral leads through the slot and conductor. Each neutral lead is then soldered, brazed, welded or otherwise mechanically and electrically affixed to its respective neutral lead termination site, the insulator 22 protecting the underlying end turns 16 of stator winding 14 from the heat of the operation. The insulator 22 further protects shorting of the neutral lead conductor 24 to the end turns 16 should the insulation on the end turns degrade or wear over time and cycles.

Figure 4:
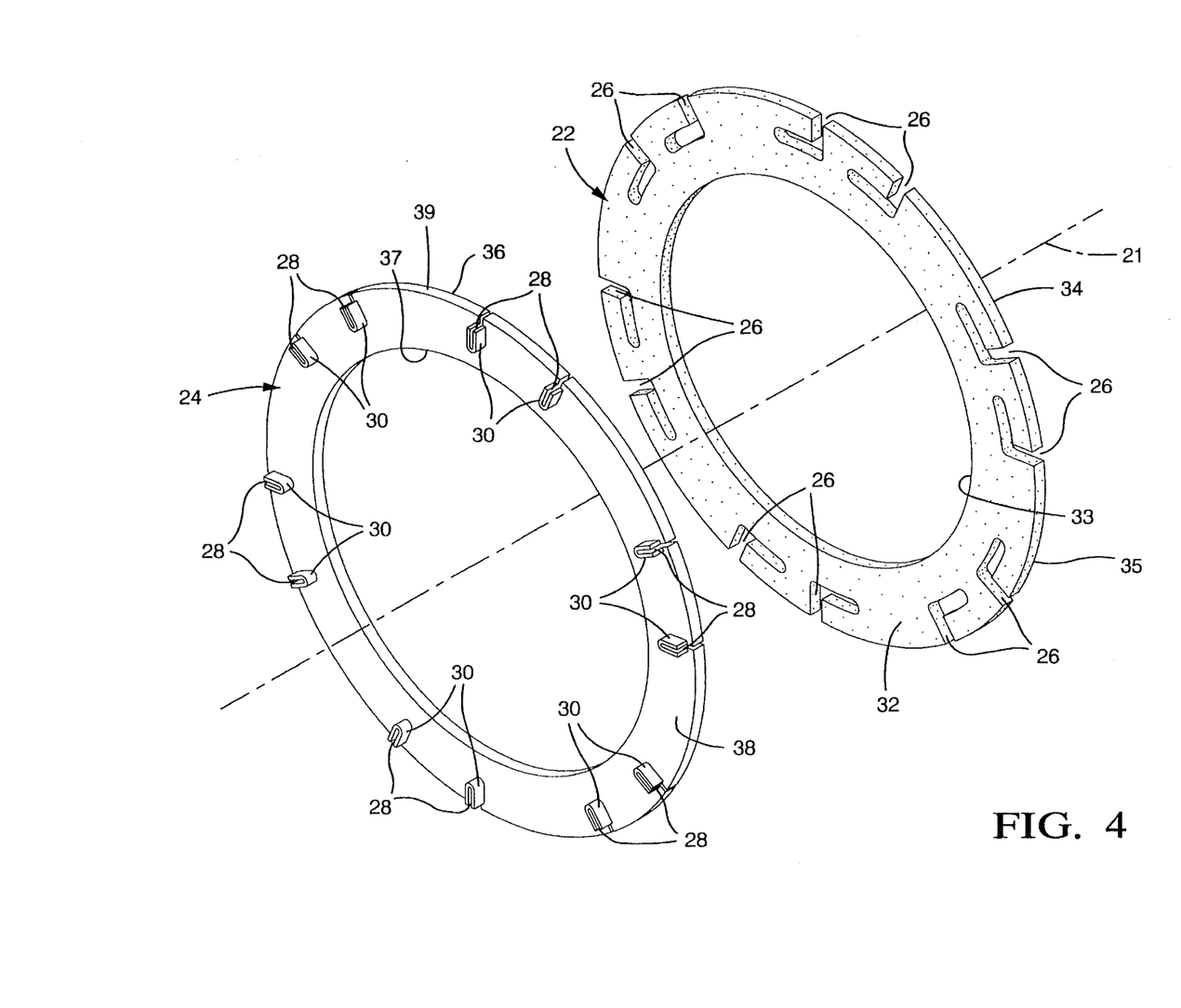
FIG. 4 is a perspective view of a neutral lead conductor and insulator for a single neutral node stator winding in accordance with the invention.
Figure 5:
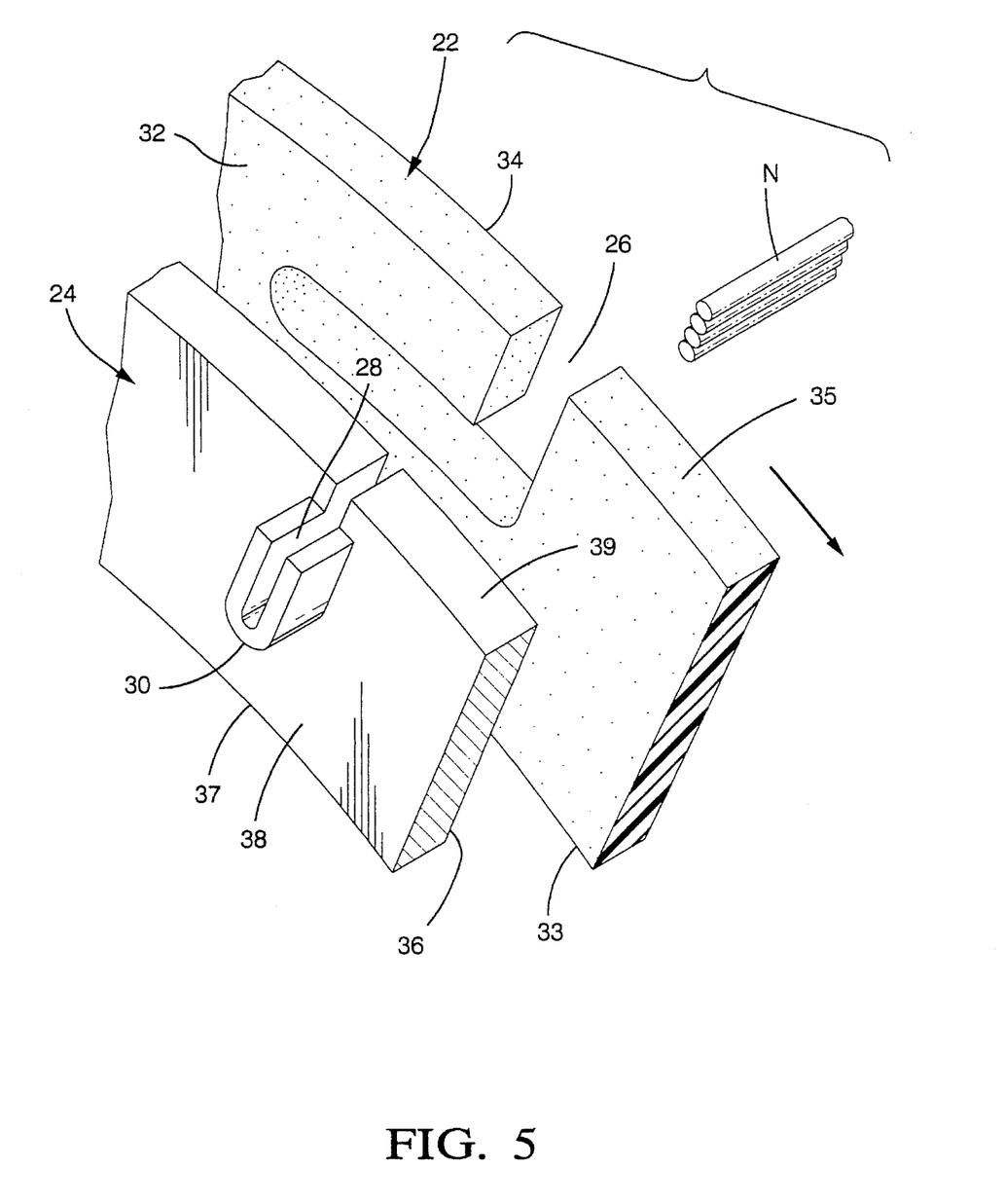
FIG. 5 is a detailed perspective view of a portion of a neutral lead termination apparatus.

Cooperative neutral lead conductor and insulator geometries especially suitable for a stator winding having a single neutral node, such as that shown in FIG. 9, are illustrated in perspective views of FIGS. 4–5. Insulator 22 is annular having inner periphery 33 and outer periphery 35, a first surface 34 for placement against end turns 16 of stator winding 14 and a second surface 32. Slots 26 are shown for acceptance of neutral leads from the outer periphery as described. In a preferred geometry, slots 26 are generally L-shaped having a radially aligned first leg open at the outer periphery of insulator 22 and a second leg generally following the periphery of the insulator. A preferred material for the insulator is silicon laminate or other suitable insulative material able to withstand the processing and operating temperatures associated with the particular application.

Neutral lead conductor 24 is electrically conductive and preferably similar to the coil winding material. In the present case, copper windings are utilized and therefore a copper neutral lead conductor is preferred. Neutral lead conductor 24 is annular having inner periphery 37, outer periphery 39, a first surface 36 adjacent the second surface 32 of insulator 22 and a second surface 38 opposite thereto. In a preferred embodiment, each neutral lead termination site comprises a radial slot 28 open toward the outer periphery of the neutral lead conductor and a generally U-shaped tower portion bracketing the radially inner portions of the slot 28 and extending substantially normal to the second surface 38 of the neutral lead conductor. Alternatively, each neutral lead termination site may comprise a slot and proximate post, stud or similar substantially normally extending structure (not illustrated) about which the neutral lead conductor may be secured. Or, a pair of projections on either side of the slot bracketing the neutral lead is another alternative. However, it is preferable to alleviate unnecessary stresses to the neutral lead conductors and, therefore, an arrangement which requires minimal deformation of the leads such as the slot and tower arrangement is preferred.

Figure 6:
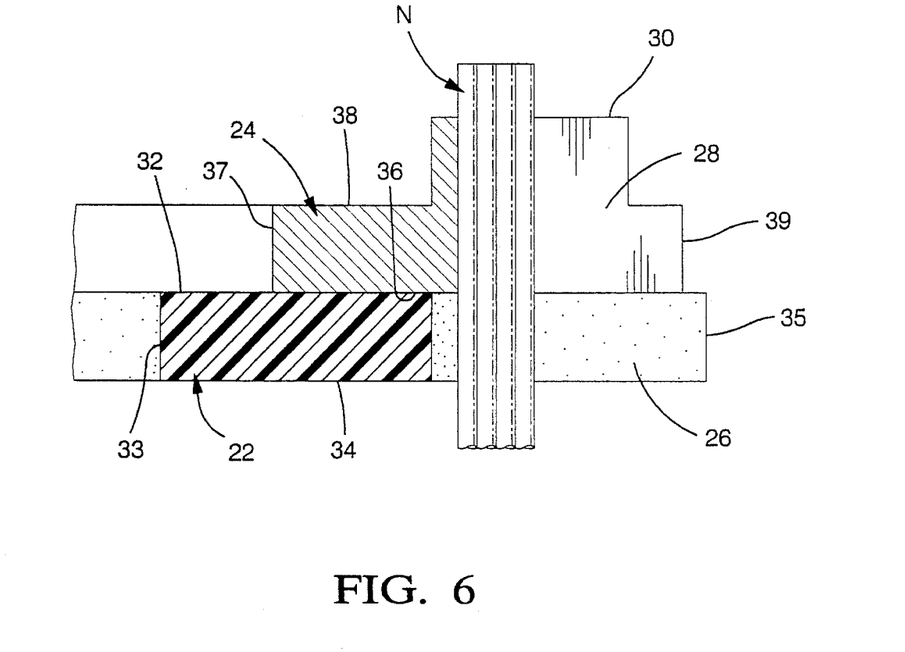
FIG. 6 is a sectional view through a single neutral lead termination site.

With reference to FIGS. 5 and 6 illustrating a preferred single neutral lead termination site, in assembly all neutral leads N are brought radially into respective insulator and neutral lead conductor slots 26 and 28 respectively such that the leads pass upward through the towers 30 of neutral lead conductor 24. Insulator 22 is then rotated as indicated by the directional arrow to thereby radially trap the neutral leads within tower 30 of neutral lead conductor 24. Each neutral lead is now mechanically and electrically secured to the neutral lead conductor at each respective neutral lead termination site. A preferred method of accomplishing this is by first crimping each tower 30 to the corresponding neutral lead therein and brazing the tower to the lead. An exemplary operation uses resistance brazing with externally applied brazing material. Alternatively, the neutral leads may be clad with brazing material prior to insertion into the neutral lead termination sites and site heating operations. The towers and multiple individual conductor coils provide for superior wicking of the brazing material. In fact, it has been found that the addition of the towers 30 to the neutral lead conductor 24 provides the unexpected benefit of concentrating the applied brazing heat to a limited area to which the brazing material has the natural tendency to flow and adhere.

Figure 2:
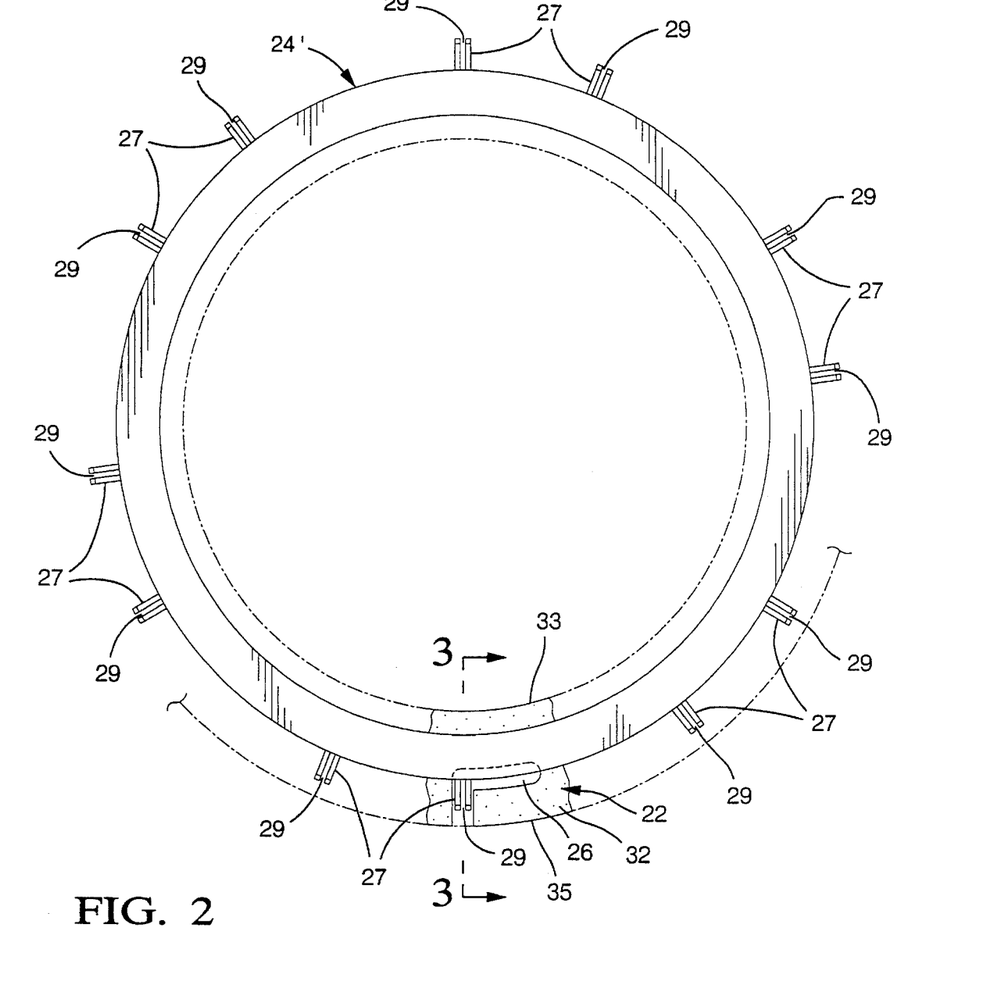
FIGS. 2 and 3 illustrate one embodiment of a neutral lead conductor for a single neutral node stator winding in accordance with the invention.
Figure 3:
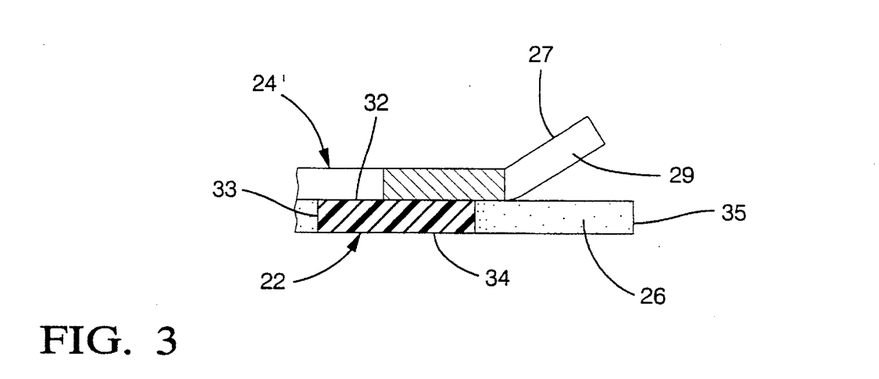
Figure 10:
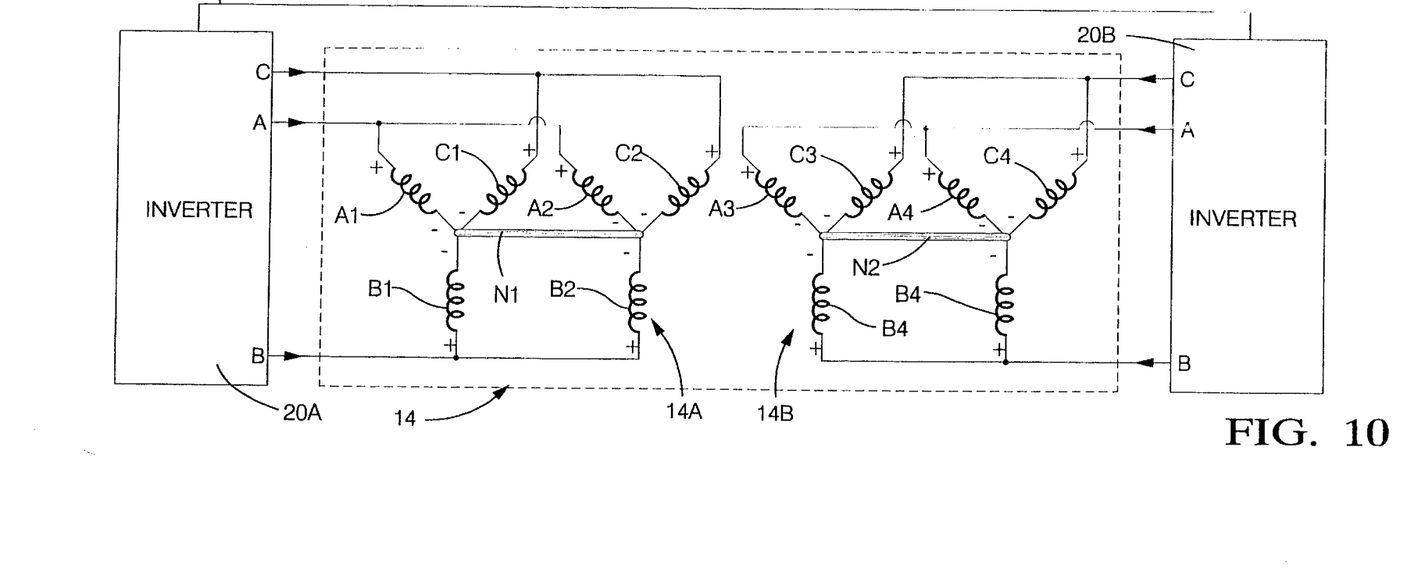
FIG. 10 is a schematic illustration of a three phase, four pole, two neutral node stator winding.

An alternative neutral lead conductor 24' is illustrated in FIGS. 2 and 3 providing certain additional benefits. The neutral lead conductor is utilized in the same basic arrangement with an insulator sandwiched therebetween the neutral lead conductor 24' and end turns 16 of stator winding 14. From the plan view of FIG. 2, it is apparent that the slots 29 for neutral lead insertion are formed between pairs of radially extending fingers 27. In this alternative, it is also noted that no tower is provided extending from the neutral lead conductor at any neutral lead termination site. A cross section through the neutral lead conductor at line 3—3 is illustrated in FIG. 2. As can be seen, the extending fingers 27 preferably are bent in the axial direction away from the insulator. This allows for visual inspection of the braze joint at the neutral lead termination sites for cold joints and other defects. Such a neutral lead conductor 24' utilizes less material and may be stamped in simple operations. In assembly, the fingers 27 are crimped together about the neutral lead and the site brazed. The benefits of heat concentration during the brazing operation is retained by the remote fingers 27. Additionally, the benefits of minimally stressed neutral leads are also present in this embodiment In certain machine applications it may be desirable or necessary to have more than one neutral node and hence an equivalent number of neutral lead conductors. For example, certain machines which may otherwise be output limited by physical or economic input limitations such as connector body and inverter capacities, may have their performance extended essentially by synchronously operating electrically isolated groups of stator windings. As an elementary example of such a machine, a winding pattern as illustrated in FIG. 8 has the phase leads and neutral leads coupled as illustrated schematically in FIG. 10. Stator winding comprises two electrically isolated groups 14A and 14B. As such, the respective phase leads and neutral leads are isolated. This being the case, a first neutral node N1 and second neutral node N2 corresponding to group 14A and 14B respectively are required. Each neutral node N1 and N2 corresponds to an electrically independent neutral lead conductor. The respective like phase leads receive respective phase voltages from an appropriate multi-phase power source such as independent inverters 20A and 20B. Line 21 therebetween the two inverters represents some modicum of communication as between the two units to accomplish synchronous polyphase operation.

Figure 7:
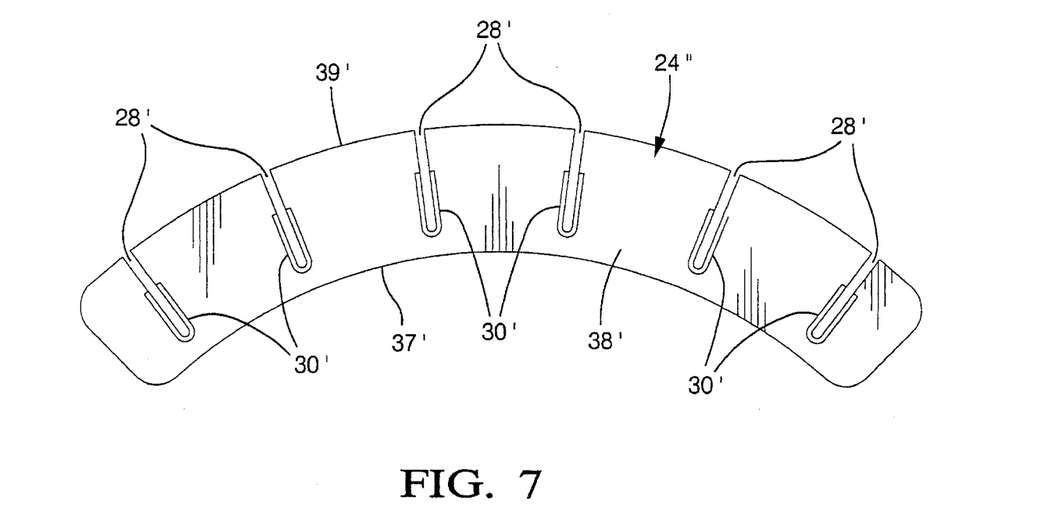
FIG. 7 is a plan view of a neutral lead conductor for a multiple neutral node stator winding.

Each neutral lead conductor will have one-half the total neutral leads coupled thereto, or six in this example. Such neutral lead conductors must be electrically physically separate. One such embodiment of such a neutral lead conductor in FIG. 7 illustrates an arcuate neutral lead conductor 24" having functionally similar features to the previously described neutral lead conductor 24. Neutral lead conductor 24" has inner periphery 37', outer periphery 39', first surface (not shown) and second surface 38'. Six neutral lead conductor slots 28' and towers 30' substantially norma to second surface 38' provide for the neutral lead termination sites. Two such neutral lead conductors 24" are utilized in conjunction with an insulator having appropriately aligning slots. Such an insulator is not herein illustrated as it is unnecessarily duplicative of features shown on insulator 22 as illustrated merely requiring superficial modifications thereto.

It is herein noted that the neutral lead conductor 24" in the present illustration extends over approximately 90 degrees of the circumference of the stator and therefore the required pair would cover approximately 180 degrees of the same circumference. It is then apparent that the various neutral leads would necessarily require varying degrees of routing about the circumference of the stator to meet up with the appropriate neutral lead termination sites. The two neutral lead conductors in such an arrangement may be placed adjacent or opposite one another about the stator circumference and the space(s) therebetween utilized for the phase lead routings.

It is also here noted that the pair of neutral lead conductors readily may be insert molded or otherwise attached to an insulating carrier by any number of well known processes.

While the invention has been described in terms a preferred embodiment, it is anticipated that various modifications and alternative embodiments will be apparent to those skilled in the art and thus the scope of the invention is intended to encompass such modifications and alternative embodiments in accord with the claims as follows.

The embodiments of the invention in which an exclusive property or privilege is claimed are defined as follows:

1. A stator assembly for a dynamoelectric machine of a type having a polyphase stator winding with at least one common neutral connection, comprising:

a stator core having an axis and a cross section normal to the axis;

a polyphase stator winding supported by said stator core and having end turns thereof located at an axial end of the stator core and a plurality of neutral leads protruding beyond the end turns;

an insulator shaped so as to follow generally a shape of a portion of the stator core cross section having inner and outer peripheries, first and second surfaces and a plurality of passages through the insulator between the first second surfaces, the first surface of the insulator being located adjacent the end turns; and, a neutral lead conductor shaped so as to follow generally the shape of the portion of the stator core cross section having inner and outer peripheries and first and second surfaces, the first surface of the conductor being located adjacent the second surface of the insulator and having a plurality of neutral lead termination sites substantially aligned with respective ones of the plurality of passages, wherein the neutral leads are routed through the passages of the insulator to the neutral lead termination sites of the conductor and mechanically and electrically coupled thereto.

2. A stator assembly as claimed in claim 1 wherein the passages through the insulator comprise slots open at the outer periphery of the insulator.

3. A stator assembly as claimed in claim 1 wherein the passages through the insulator comprise L-shaped slots having first legs open at the outer periphery of the insulator and second legs generally following the outer periphery of the insulator, the neutral leads being routed through the second legs of the slots.

4. A stator assembly as claimed in claim 1 wherein each of the plurality of neutral lead termination sites comprise a slot open at the outer periphery of the neutral lead conductor and a generally U-shaped projection bracketing a portion of the slot.

5. A stator assembly as claimed in claim 1 wherein the neutral lead conductor is substantially annular shaped and the termination sites comprise slots open at the outer periphery of the neutral lead conductor and generally U-shaped projections bracketing a portion of respective slots.

6. A stator assembly as claimed in claim 1 wherein the neutral lead conductor is substantially annular shaped and the termination sites comprise respective pairs of substantially radially extending fingers.

7. A stator assembly as claimed in claim 6 wherein the pairs of substantially radially extending fingers are bent away from the insulator.

8. A stator assembly for a dynamoelectric machine of type having a polyphase stator winding with at least one common neutral connection, comprising:

a stator core having an axis and a cross section normal to the axis;

a polyphase stator winding supported by said stator core and having end turns thereof located at an axial end of the stator core and a plurality of neutral leads protruding beyond the end turns;

an insulator shaped so as to generally follow a shape of a portion of the stator core cross section having inner and outer peripheries, first and second surfaces and a plurality of passages through the insulator between the first and second surfaces and open at the outer periphery of the insulator, the first surface of the insulator being located adjacent the end turns; and, a neutral lead conductor shaped so as to follow the shape of a portion of the stator core cross section having inner and outer peripheries and first and second surfaces, the first surface of the conductor being located adjacent the second surface of the insulator said conductor having a plurality of slots between the first and second surfaces and open at the outer periphery of the conductor, and a plurality of generally U-shaped projections bracketing a portion of each one of the plurality of slots, the plurality of slots being substantially aligned with respective ones of the plurality of passages, wherein the neutral leads are routed through the passages of the insulator and slots of the conductor to the U-shaped projections of the conductor and mechanically and electrically coupled thereto.

* * * * *